United States Patent
Liang et al.

(10) Patent No.: US 8,861,199 B2
(45) Date of Patent: Oct. 14, 2014

(54) LOCKING MECHANISM AND ELECTRONIC DEVICE HAVING THE SAME

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 248 days.

(21) Appl. No.: 13/442,944

(22) Filed: Apr. 10, 2012

(65) Prior Publication Data

US 2012/0287561 A1  Nov. 15, 2012

(30) Foreign Application Priority Data

May 9, 2011 (TW) .............................. 100116134 A (51) Int. Cl.
G06F 1/16 (2006.01)
(52) U.S. Cl.
CPC ............ G06F 1/1616 (2013.01); G06F 1/1679 (2013.01)
USPC ................... 361/679.58; 361/679.27; 292/95; 292/251.5
(58) Field of Classification Search
CPC .... G06F 1/1616; G06F 1/1633; G06F 1/1679
USPC .................................................. 361/679.58
See application file for complete search history.

(56) References Cited

U.S. PATENT DOCUMENTS

| | | | | |
|---|---|---|---|---|
| 5,518,282 A | * | 5/1996 | Sawada | 292/252 |
| 6,890,008 B1 | * | 5/2005 | Chuang et al. | 292/121 |
| 7,261,331 B2 | * | 8/2007 | Lin | 292/116 |
| 7,612,993 B1 | * | 11/2009 | Takei et al. | 361/679.31 |
| 7,644,963 B2 | * | 1/2010 | Fan et al. | 292/95 |
| 8,331,089 B2 | * | 12/2012 | Tseng | 361/679.55 |
| 2007/0290512 A1 | * | 12/2007 | Fan et al. | 292/95 |
| 2008/0150301 A1 | * | 6/2008 | Homner | 292/95 |
| 2008/0179897 A1 | * | 7/2008 | Wu et al. | 292/251.5 |
| 2010/0270817 A1 | * | 10/2010 | Yu | 292/251.5 |
| 2012/0206873 A1 | * | 8/2012 | Schwager et al. | 361/679.21 |

FOREIGN PATENT DOCUMENTS

CN 201117274 Y 9/2008

OTHER PUBLICATIONS

Korean International Property Office, Office Action and Translation, and Cited References and Translations for KR-10-22100084001.
Office Action Issued by the Taiwan Intellectual Property Office on Taiwanese Counterpart Application and Translation thereof TW100116134, and Cited References and Translations for TW201042424A1 and TWM364396U1.
Chinese Patent Office, Office Action and English Translation of Chinese Counterpart Patent Application No. 201110142041.0, Issued Jun. 5, 2014.

* cited by examiner

*Primary Examiner* — Anthony Q Edwards
(74) *Attorney, Agent, or Firm* — Shook, Hardy & Bacon, LLP (57) ABSTRACT

A locking mechanism is adapted for locking an object, and includes a housing and a locking member. The housing includes a base wall and a cover extending from the base wall to form a mounting space therebetween, and a mounting port in spatial communication with the mounting space and adapted for permitting the object to be moved into the mounting space therethrough in a mounting direction. The locking member is snapped onto the cover so as to prevent removal of the object from the mounting space through the mounting port in a direction opposite to the mounting direction, in such a manner that a portion of the locking member is disposed in proximity to the mounting port and abuts against one of the sides of the object facing the mounting port.

20 Claims, 9 Drawing Sheets

LOCKING MECHANISM AND ELECTRONIC DEVICE HAVING THE SAME

CROSS-REFERENCE TO RELATED APPLICATION

This application claims priority of Taiwanese Application No. 100116134, filed on May 9, 2011, the disclosure of which is incorporated herein by reference.

BACKGROUND OF THE INVENTION

1. Field of the Invention

This invention relates to a locking mechanism, and more particularly to a locking mechanism for locking an object on an electronic device.

2. Description of the Related Art

Taiwanese Patent No. M348452 discloses a magnet-locking construction and a notebook computer having the same. The magnet-locking construction includes a bottom plate and a top wall. A first sidewall, a second sidewall, a third sidewall are connected between the top and bottom plate. An inlet is formed between the bottom plate and the top wall to allow a magnet to be placed into a space between the second and third sidewalls through the inlet. The distance between the second and third sidewalls is smaller than the width of the magnet, and the third sidewall is deformable resiliently so as to clamp and lock the magnet between the second and third sidewalls.

However, since the magnet is locked by only the clamping force of the second and third sidewalls, if the notebook computer falls down or is subjected to an impact resulting from an application of an external force, the magnet may separate from the second and third sidewalls. As such, the magnetic-locking construction cannot lock effectively the magnet.

SUMMARY OF THE INVENTION

The object of this invention is to provide a locking mechanism that can overcome the above-mentioned drawback associated with the prior art.

According to an aspect of this invention, there is provided a locking mechanism adapted for locking an object, the object having two opposite sides, the locking mechanism comprising:

a housing including a base wall and a cover extending from the base wall to form a mounting space therebetween, and a mounting port in spatial communication with the mounting space and adapted for permitting the object to be moved into the mounting space therethrough in a mounting direction; and a locking member snapped onto the cover so as to prevent removal of the object from the mounting space through the mounting port in a direction opposite to the mounting direction, in such a manner that a portion of the locking member is disposed in proximity to the mounting port and abuts against one of the sides of the object facing the mounting port.

According to another aspect of this invention, there is provided an electronic device comprising:

a first body;

a second body connected pivotally to the first body and pivotable relative to the first body to cover the first body, the second body including an object, and a locking mechanism including a housing and a locking member, the housing including a base wall and a cover member extending from the base wall to form a mounting space therebetween, and a mounting port in spatial communication with the mounting space and permitting the object to be moved into the mounting space therethrough in a mounting direction, the locking member being snapped onto the cover so as to prevent removal of the object from the mounting space through the mounting port in a direction opposite to the mounting direction, in such a manner that a portion of the locking member is disposed in proximity to the mounting port and abuts against one of the sides of the object facing the mounting port.

BRIEF DESCRIPTION OF THE DRAWINGS

These and other features and advantages of this invention will become apparent in the following detailed description of the embodiments of this invention, with reference to the accompanying drawings, in which.

DETAILED DESCRIPTION OF THE PREFERRED EMBODIMENTS

Before the present invention is described in greater detail in connection with the embodiments, it should be noted that similar elements and structures are designated by like reference numerals throughout the entire disclosure.

Figure 1:
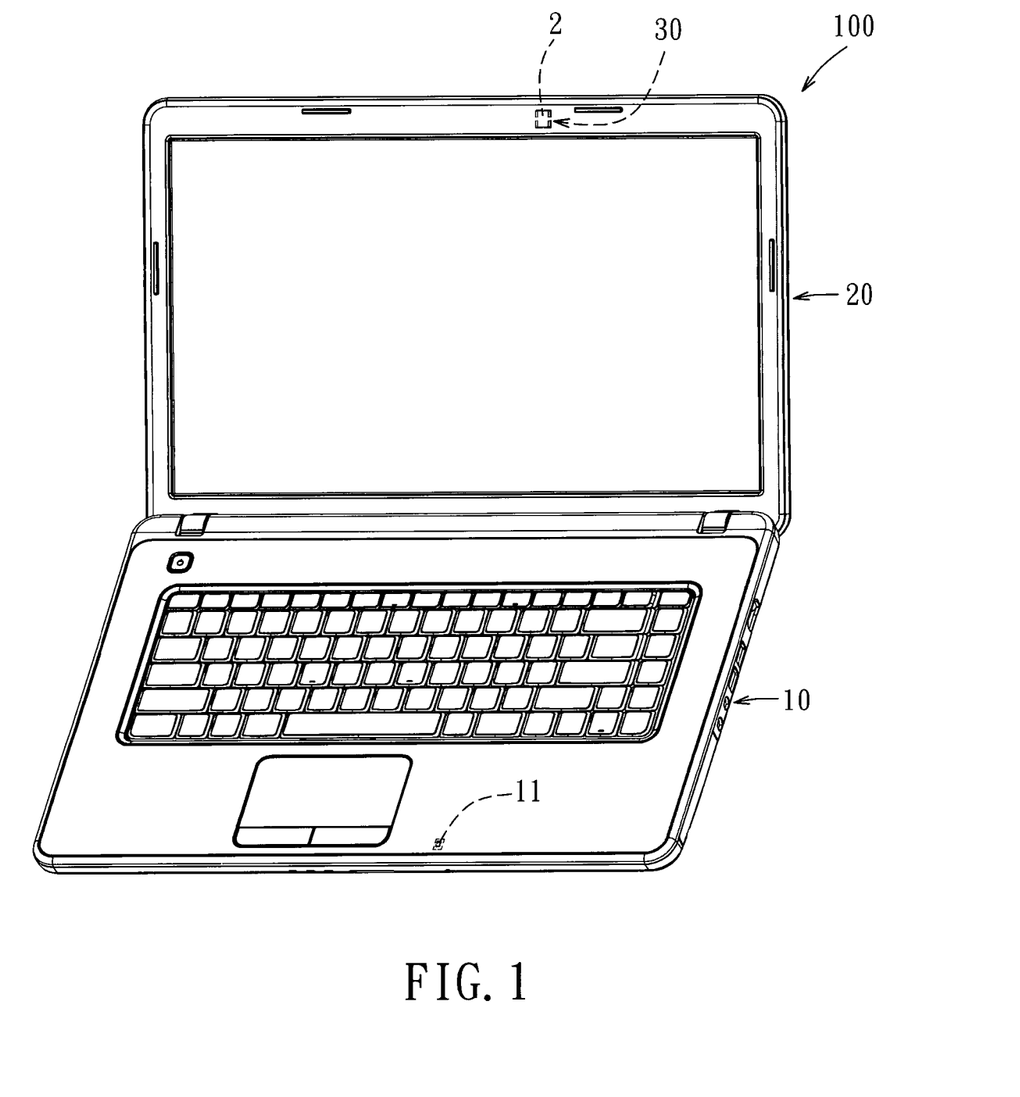
FIG. 1 is a perspective view of the first embodiment of an electronic device according to this invention.

Referring to FIG. 1, the first embodiment of an electronic device 100 according to this invention includes a first body 10 and a second body 20 having a side connected pivotally to a side of the first body 10. In this embodiment, the electronic device 100 is exemplified using a notebook computer. Alternatively, the electronic device 100 may be a mobile phone or a personal digital assistant.

Figure 2:
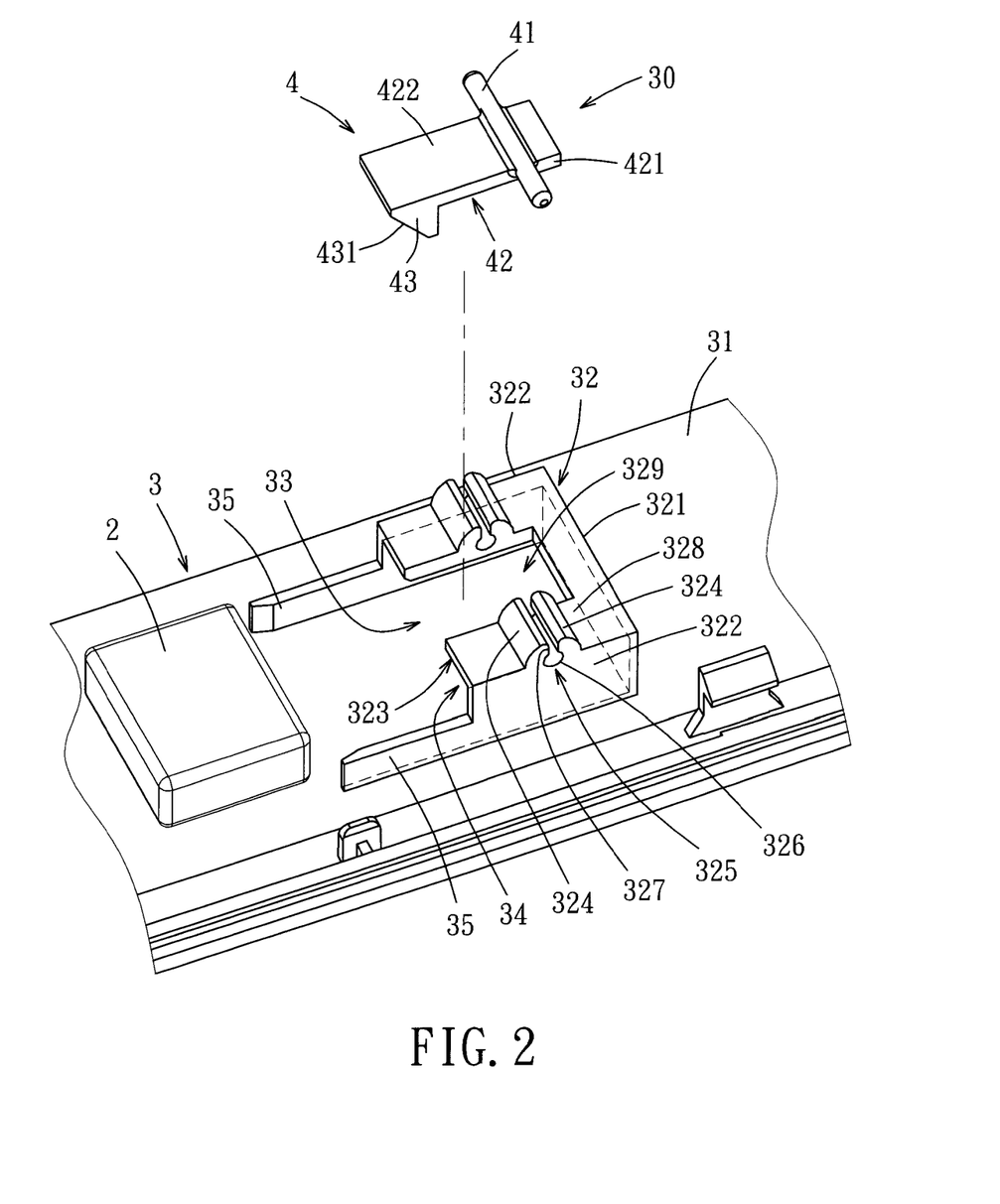
FIG. 2 is a fragmentary exploded perspective view of a locking mechanism of the first embodiment.

With additional reference to FIG. 2, the first body 10 is a host provided with electronic elements including a motherboard, a hard disk drive, an optical disk drive, etc. The first body 10 includes a magnetically conducting element 11, such as a metallic sheet or a magnet. The second body 20 is a display for covering the first body 10, and includes an object 2 and a locking mechanism 30 for locking the object 2. In this embodiment, the object is exemplified using a magnet. When the second body 20 is covered on the first body 10, the object 2 is aligned with the magnetically conducting element 11, so as to produce a magnetic attractive force therebetween, thereby locking the second body 20 on the first body 10.

The locking mechanism 30 includes a housing 3 and a locking member 4. The housing 3 includes a base wall 31 and a cover 32 extending from the base wall 31 to form a mounting space 33 therebetween, a mounting port 34 in spatial communication with the mounting space 33 and permitting the object 2 to be moved into the mounting space 33 therethrough in a mounting direction (I) (see FIG. 4). The locking member 4 is snapped onto the cover 32 so as to prevent removal of the object 2 from the mounting space 33 through the mounting port 34 in a direction opposite to the mounting direction (I). A portion of the locking member 4 is disposed in proximity to the mounting port 34, and abuts against a side of the object 2 facing the mounting port 34. In this manner, the object 2 is locked effectively within the mounting space 33, and is thus prevented from removal from the mounting space 33.

The structure and assembly of the locking mechanism 30 will be described in the following.

Figure 3:
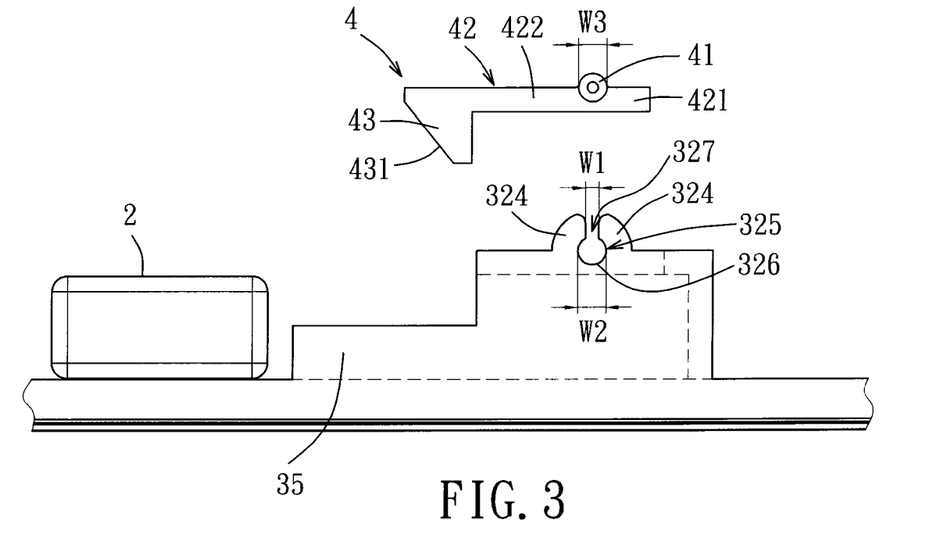
FIG. 3 is an exploded side view of the locking mechanism of the first embodiment.

With further reference to FIG. 3, the housing 32 includes a stop wall 321 for obstructing removal of the object 2 from the mounting space 33 in the mounting direction (I), two parallel side walls 322 connected respectively to two opposite ends of the stop wall 321, and a top wall 333 connected to top ends of the side walls 322 and disposed above and spaced apart from the base wall 31. The mounting space 33 is defined among the base wall 31, the stop wall 321, the side walls 322, and the top wall 323. The mounting port 34 is defined by the base wall 31 and ends of the side walls 322 and the top wall 323 that are distal from the stop wall 321. Two guide plates 35 extend from the base wall 31, and are connected respectively and integrally to the side walls 322.

The top wall 323 of the housing 32 includes a wall portion 328 and at least one pair of limiting resilient arms 324 extending from the wall portion 328 to form a retaining groove 325 among the wall portion 328 and the limiting resilient arms 324. The locking member 4 includes a rod portion 41 engaged within the retaining groove 325, a supporting arm 42 connected to the rod portion 41, and a hook portion 43 extending from an end of the supporting arm 42, abutting against the object 2, and constituting the portion of the locking member 4 disposed in proximity to the mounting port 34. As such, the object 2 is confined between the stop wall 321 and the hook portion 43 of the locking member 43, between the side walls 322, and between the base wall 31 and the top wall 323. In this embodiment, the retaining groove 325 extends along a direction perpendicular to the mounting direction (I), and has a retaining groove portion 326 engaging the rod portion 41, and a guiding groove portion 327 that is open upwardly for guiding downward movement of the rod portion 41 into the retaining groove portion 326 in an assembling direction (II) (see FIG. 5). During assembly, when the rod portion 41 is engaged into the retaining groove portion 326, the hook portion 43 is moved to a position adjacent to the mounting port 34 for obstructing the object 2.

To confine the rod portion 41 of the locking member 4 within the retaining groove portion 326 of the retaining groove 325, the width (W1) (see FIG. 3) of the guiding groove portion 327 is smaller than the width (W2) (see FIG. 3) of the retaining groove portion 326 and the width (W3) (see FIG. 3) of the rod portion 41. When the rod portion 41 is moved into the guiding groove portion 327, it pushes the limiting resilient arms 324 away from each other. As soon as the rod portion 42 is moved into the retaining groove portion 326, the limiting resilient arms 324 return to their original positions, so as to prevent upward removal of the rod portion 41 from the retaining groove portion 326 through the guiding groove portion 327, thereby ensuring engagement of the rod portion 41 within the retaining groove portion 326.

In this embodiment, the top wall 323 includes one wall portion 328 connected to the stop wall 321 and the side walls 322, and two spaced-apart pairs of limiting resilient arms 324 extending from the wall portion 328. The wall portion 328 has a hole 329 that is formed therethrough in a vertical direction and between the spaced-apart pairs of the limiting resilient arms 324, that is in spatial communication with the mounting space 33 and the mounting port 34, and that receives the supporting arm 42 of the locking member 4. Two retaining grooves 325 are defined respectively by the pairs of the limiting resilient arms 324. The rod portion 41 is cylindrical, and is received rotatably within the retaining grooves 325, so as to allow for rotation of the locking member 4 relative to the cover 32 about the axis of the rod portion 41. As such, the hook portion 43 of the locking member 4 is rotatable away from the mounting port 34 so as to allow for movement of the object 2 into the mounting space 33 through the mounting port 34.

The supporting arm 42 is divided by the rod portion 41 into a force-resisting portion 421 distal from the mounting port 34, and a force-applying portion 422 proximate to the mounting port 34. The hook portion 43 extends from the force-applying portion 422, and includes an inclined contact surface 431 that is contactable with the object 2 so as to be pushed by the object 2 to rotate about the axis of the rod portion 41 in a clockwise direction (III) (see FIG. 6) during movement of the object into the mounting space 33. Due to inclusion of the hole 329 in the top wall 323, during rotation of the locking member 4 by the object 2, the force-resisting portion 421 is moved into the mounting space 33. When the object 2 is moved within the mounting space 33, it contacts and pushes the force-resisting portion 421 of the locking member 4 to rotate toward the mounting port 34 about the axis of the rod portion 41 in a counterclockwise direction (IV) until the hook portion 43 comes into contact with the object 2.

Two assembling processes can be used to mount the object 2 into the mounting space 33.

Figure 4:
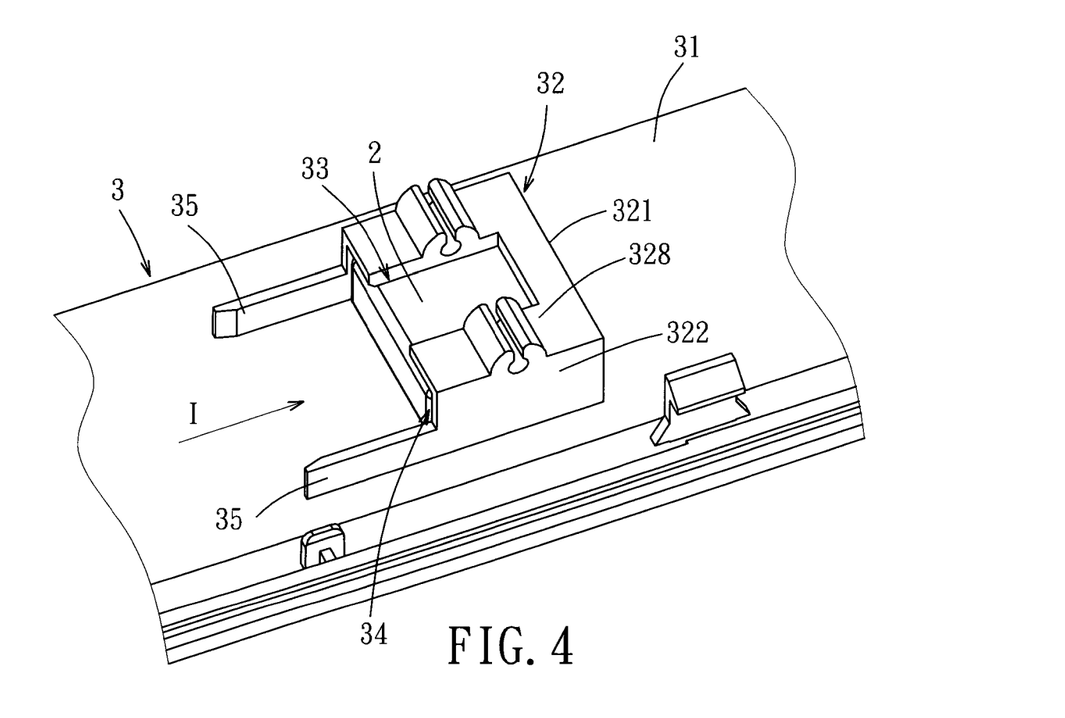
FIG. 4 is a fragmentary perspective view of a housing of the locking mechanism of the first embodiment.
Figure 5:
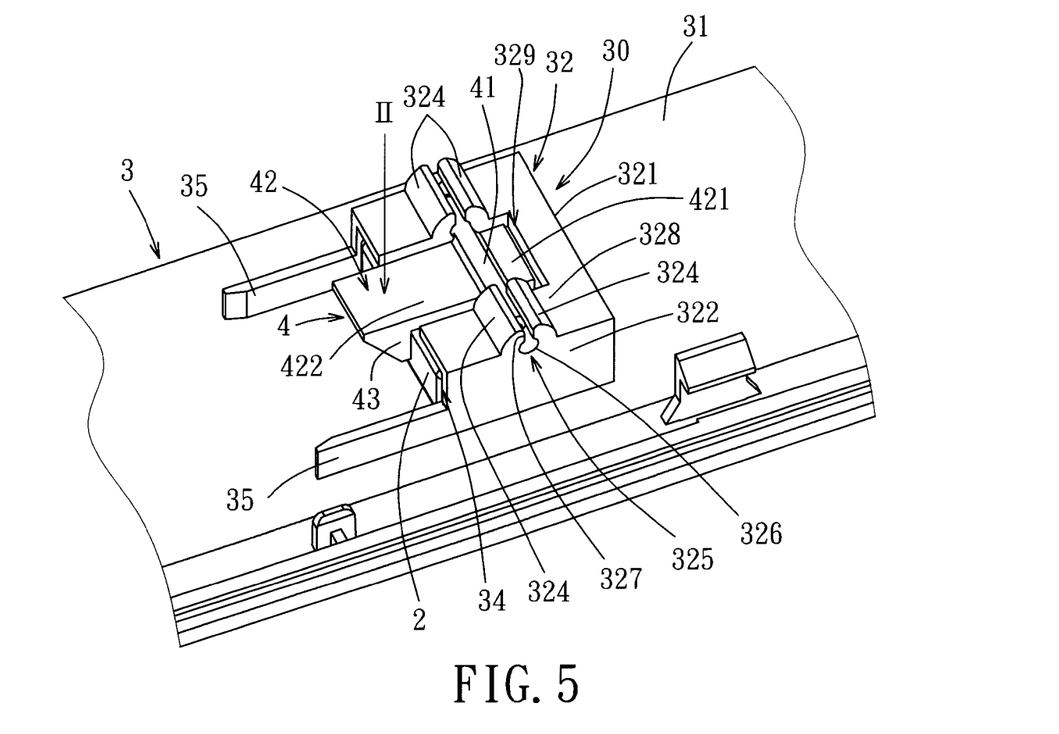
FIG. 5 is a fragmentary assembled perspective view of the locking mechanism of the first embodiment.

With particular reference to FIGS. 2, 4, and 5, in the first assembling process, the object 2 is mounted to the housing 3 prior to assembly of the locking member 4 to the housing 3. That is, the object 2 is first moved to align with the mounting port 34, and into the mounting space 33 through the mounting port 34 along the guide plates 35 in the mounting direction (I). Next, the rod portion 41 of the locking member 4 is engaged into the retaining groove portion 326 of the retaining groove 325 in the assembling direction (II).

Figure 6:
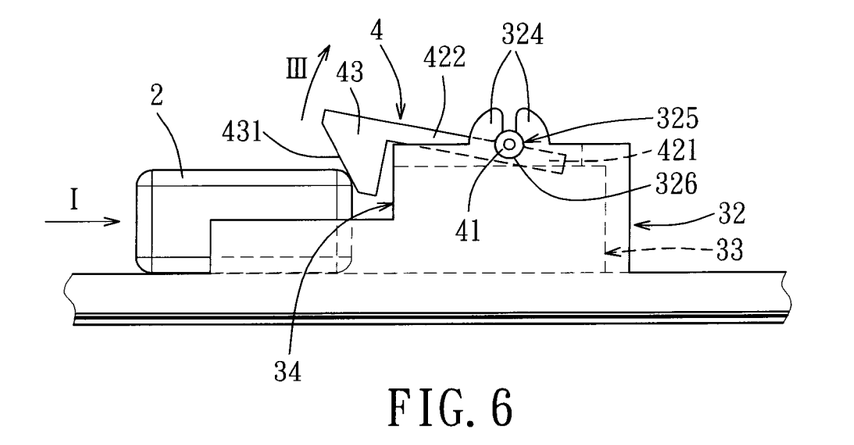
FIGS. 6, 7, and 8 are schematic side views of the locking mechanism of the first embodiment, illustrating how an object is moved into a mounting space.
Figure 7:
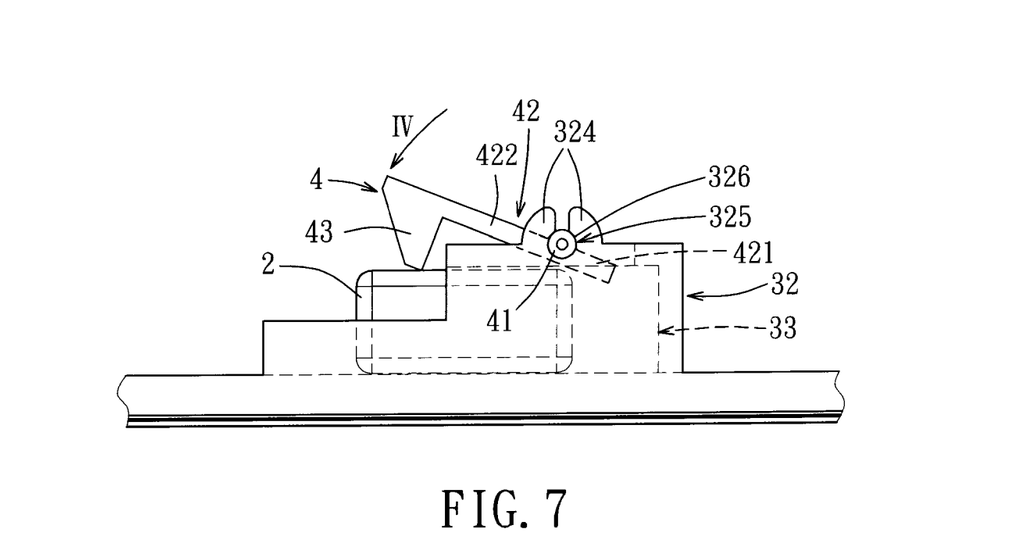
Figure 8:
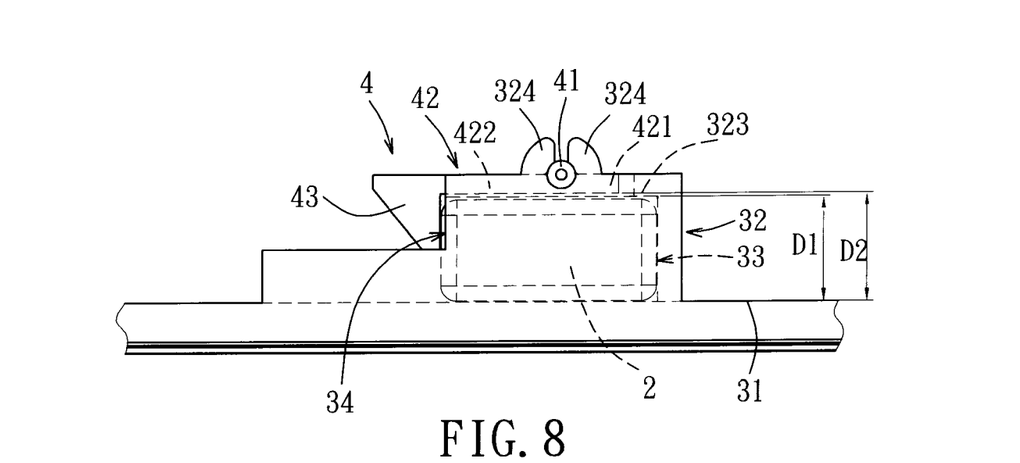

With particular reference to FIGS. 6, 7, and 8, in the second assembling process, the locking member 4 is mounted to the housing 3 prior to assembly of the object 2 to the housing 3. That is, the rod portion 41 of the locking member 4 is first engaged into the retaining groove portion 326 of the retaining groove 325, so that the hook portion 43 of the locking member 4 is disposed in proximity to the mounting port 34. Next, the object 2 is moved into the mounting space 33 through the mounting port 34 in the mounting direction (I). During movement of the object 2 into the mounting space 33, when a leading end (i.e., right end) of the object 2 comes into contact with the inclined contact surface 431, it pushes the locking member 4 to rotate about the axis of the rod portion 42 in the clockwise direction (III), as shown in FIG. 6. When the leading end of the object 2 moves past the hook portion 43 to contact the force-resisting portion 421, it pushes the locking member 4 to rotate about the axis of the rod portion 42 in the counterclockwise direction (IV), as shown in FIG. 7. Hence, the object 2 can be moved entirely into the mounting space 33, as shown in FIG. 8.

With particular reference to FIGS. 6, 7, and 8, when the electronic device 100 falls downward, or is subjected to an impact resulting from an application of an external force, so that the object 2 is moved in the direction opposite to the mounting direction (I) to strike the hook portion 43 of the locking member 4, since the assembling direction (II) of the locking member 4 is perpendicular to the mounting direction (I) of the object 2, the rod portion 41 of the locking member 4 cannot separate from the retaining groove portion 326 of the retaining groove 325, so that the locking member 4 can remain in situ, thereby avoiding undesired removal of the object 2 from the mounting space 33.

Furthermore, since the base wall 31 and the top wall 323 are spaced apart from each other by a distance (D1) (see FIG. 8) that is smaller than the distance (D2) between the base wall 31 and the supporting arm 42 of the locking member 4, When an external force is applied to move the object 2 upwardly, the object 2 comes into contact with the top wall 323. In other words, if the object 2 is moved upwardly, it cannot contact the supporting arm 42 of the locking member 4, thereby further preventing upward removal of the rod portion 41 from the retaining groove 325. As a consequence, the locking member 4 can be retained effectively on the cover 32, so that the hook portion 43 can be maintained at a position obstructing removal of the object 2.

When removal of the object 2 is desired, since the mounting direction (I) is perpendicular to the assembling direction (II), it is necessary to separate the locking member 4 from the retaining groove 325 prior to removal of the object 2.

Figure 9:
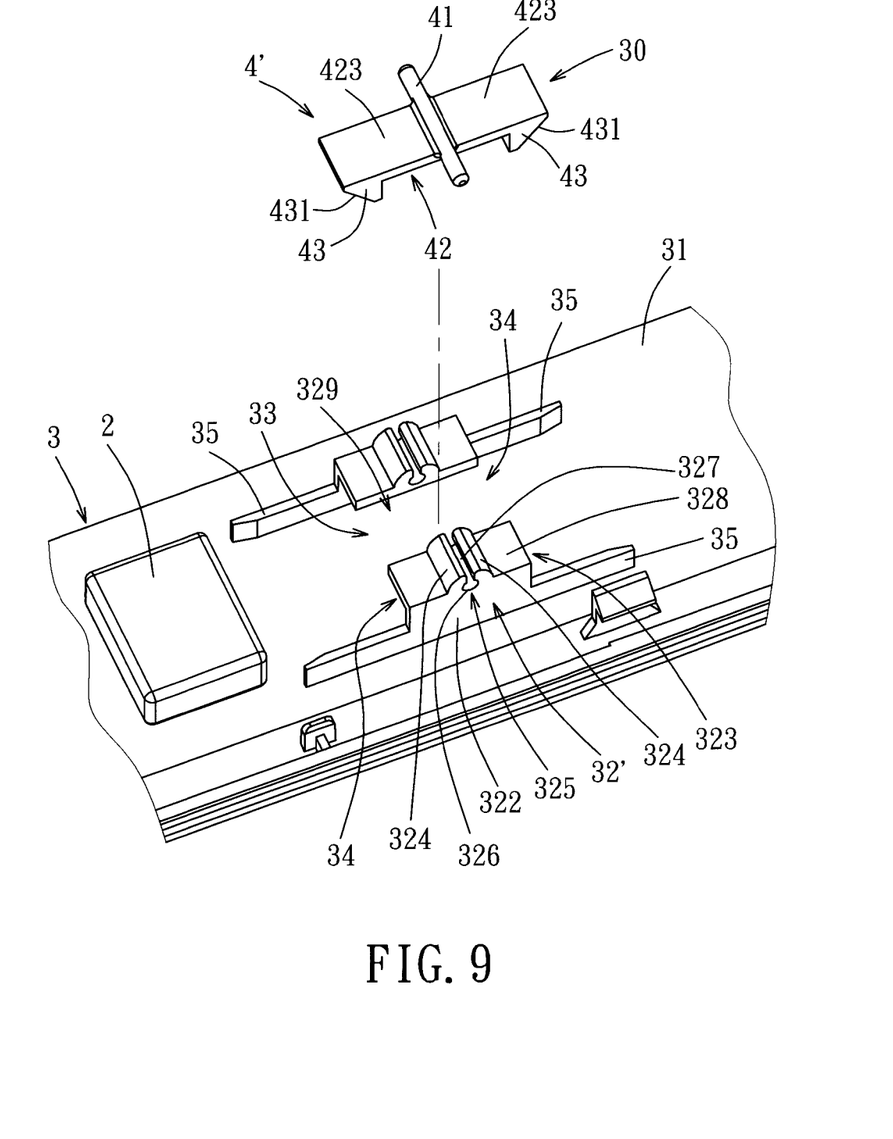
FIG. 9 is a fragmentary exploded perspective view of a locking mechanism of the second embodiment.

FIG. 9 shows the second embodiment of an electronic device according to this invention, which differs from the first embodiment in the cover 32' of the locking mechanism 30 and the locking member 4'.

In this embodiment, the base wall 321, the side walls 322, and the top wall 323 of the cover 32' cooperate to form two mounting ports 34 in spatial communication with two opposite ends of the mounting space 33, respectively. The object 2 can be mounted into the mounting space 33 through either of the mounting ports 34. Hence, the object 2 can be moved into the mounting space 33 in the mounting direction (I) or (V). The locking member 4' includes two hook portions 43 extending respectively from two opposite ends of the supporting arm 42 and abutting respectively against two opposite sides of the object 2 that face respectively the mounting ports 34. In this embodiment, the mounting space 33 is defined between the two hook portions 43. As such, the object 2 can be locked effectively within the mounting space 33.

The hole 329 is in spatial communication with the mounting ports 34. The supporting arm 42 of the locking member 4' is disposed within the hole 329, and includes two arm portions 423 located respectively to two opposite sides of the rod portion 41 and adjacent respectively to the mounting ports 34. The arm portions 423 are contactable with the object 2 so as to be pushed by the object to rotate about the axis of the rod portion 41 during movement of the object 2 into the mounting space 33. The hook portions 43 extend respectively from the arm portions 423. Each of the hook portions 43 includes an inclined contact surface 432 that are contactable with the object 2 so as to be pushed by the object 2 to rotate about the axis of the rod portion 41 during movement of the object 2 into the mounting space 33. The housing 3 further includes two pairs of guide plates 35 extending from the base wall 31 and connected respectively to ends of the side walls 322. One pair of the guide plates 35 is disposed for guiding movement of the object 2 into the mounting space 33 through one of the mounting ports 34. The other pair of the guide plates 35 is disposed for guiding movement of the object 2 into the mounting space 33 through the other of the mounting ports 34.

Two assembling processes can be used to mount the object 2 into the mounting space 33.

Figure 10:
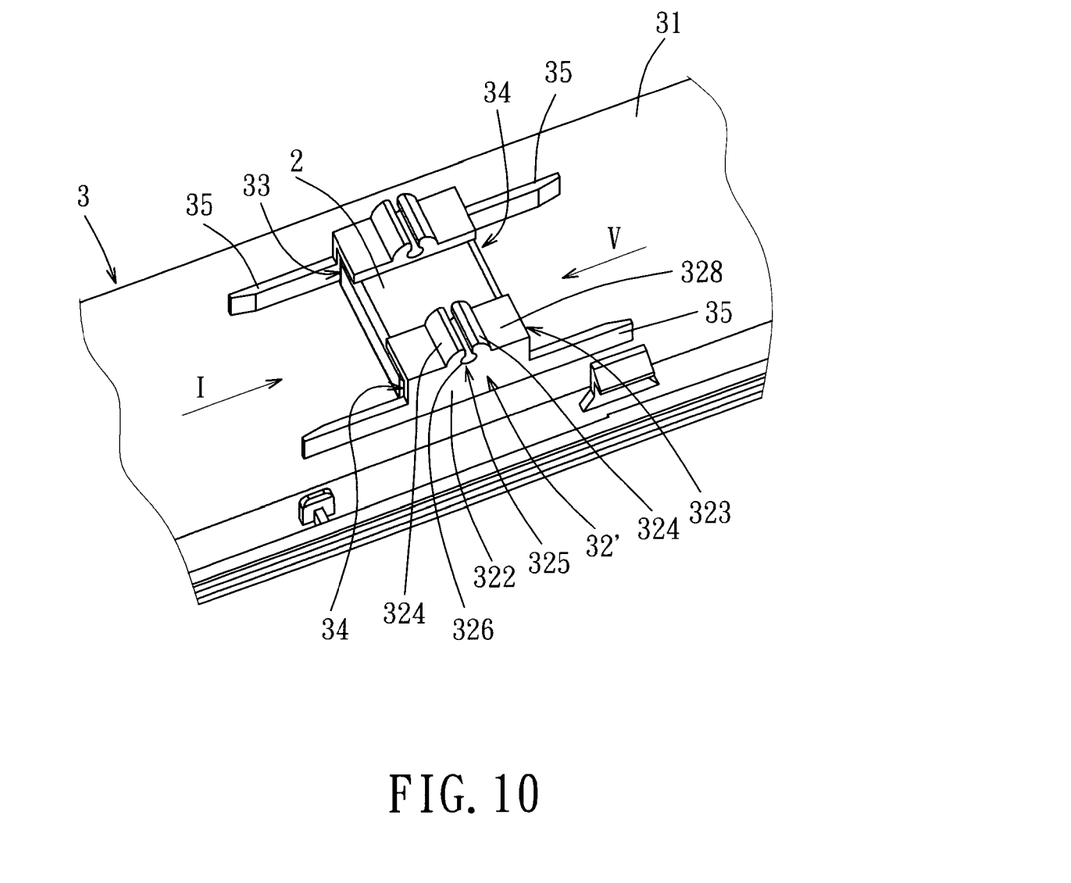
FIG. 10 is a fragmentary perspective view of a housing of the locking mechanism of the second embodiment.
Figure 11:
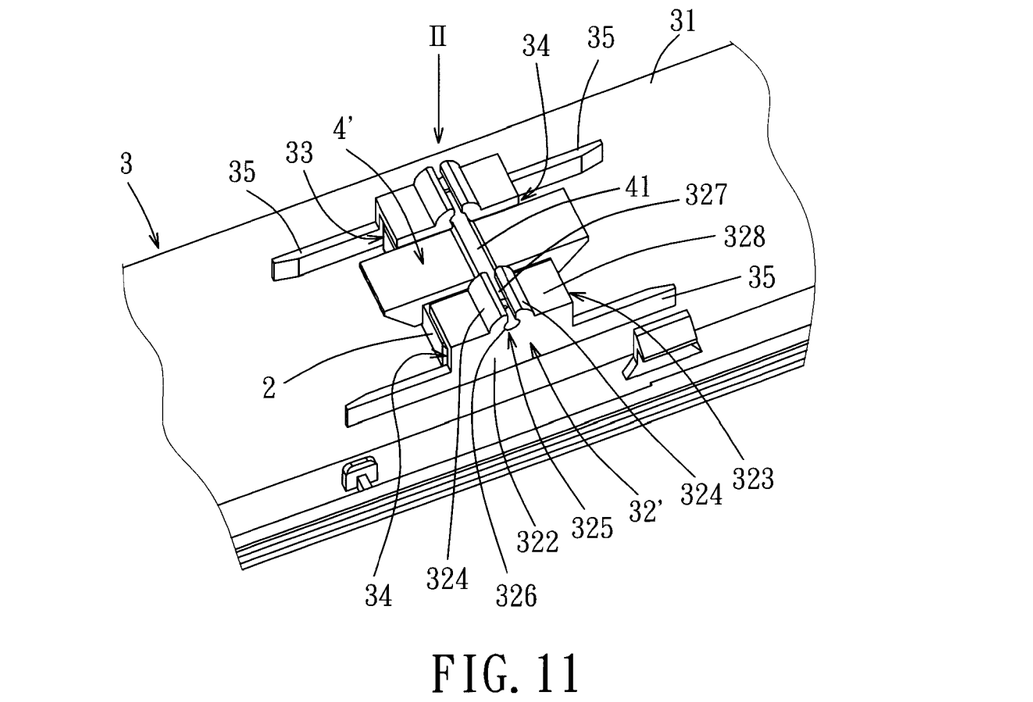
FIG. 11 is a fragmentary assembled perspective view of the locking mechanism of the second embodiment.

With particular reference to FIGS. 9, 10, and 11, in the first assembling process, the object 2 is mounted to the housing 3 prior to assembly of the locking member 4' to the housing 3. That is, the object 2 is moved to align with the left mounting port 34, and into the mounting space 33 through the left mounting port 34 along the left pair of the guide plates 35 in the mounting direction (I), or the object 2 is moved to align with the right mounting port 34, and into the mounting space 33 through the right mounting port 34 along the right pair of the guide plates 35 in the mounting direction (V). Subsequently, the rod portion 41 of the locking member 4' is engaged into the retaining groove portion 326 of the retaining groove 325.

Figure 12:
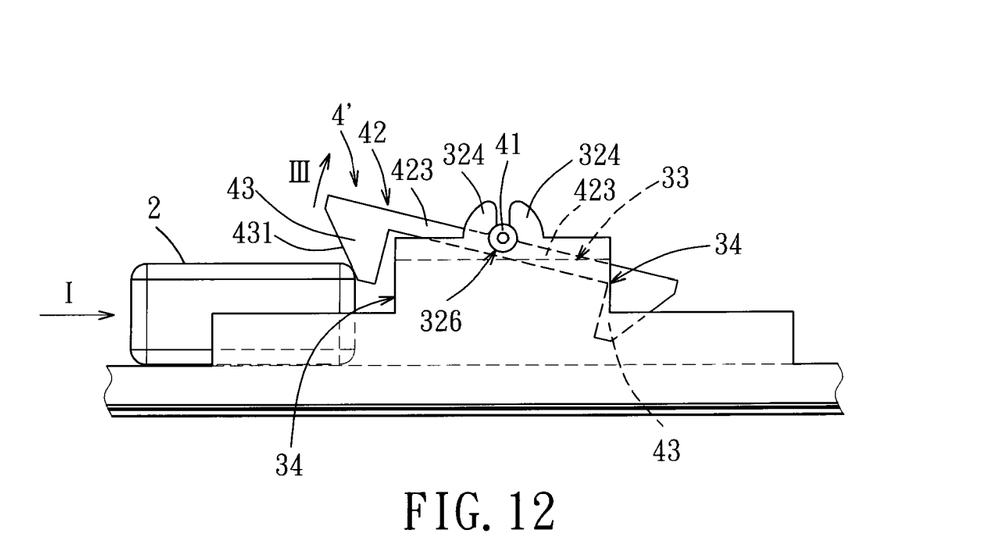
FIGS. 12, 13, and 14 are schematic side views of the locking mechanism of the second embodiment, illustrating how an object is moved into a mounting space.
Figure 13:
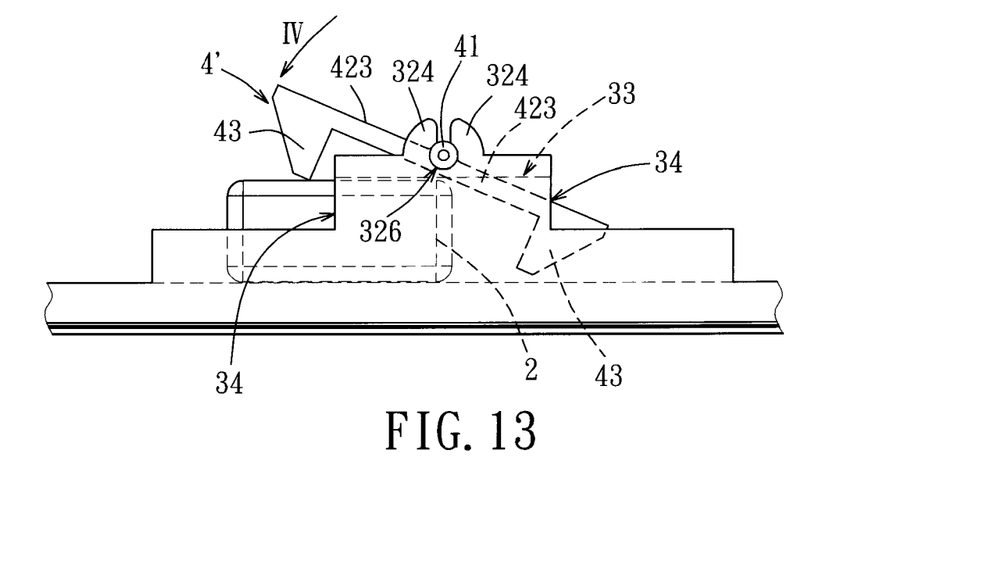
Figure 14:
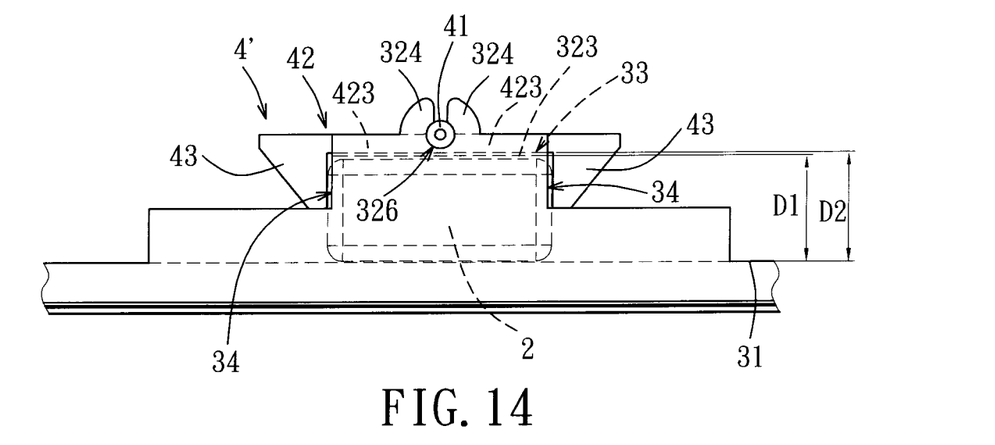

With particular reference to FIGS. 12, 13, and 14, in the second assembling process, the locking member 4' is mounted to the housing 3 prior to assembly of the object 2 to the housing 3. That is, the rod portion 41 of the locking member 4' is first engaged into the retaining groove portion 326 of the retaining groove 325, so that the hook portions 43 of the locking member 4' are disposed respectively in proximity to the mounting ports 34. Next, the object 2 is moved into the mounting space 33 through either of the mounting ports 34. For example, the object 2 can be mounted into the mounting space 33 through the left mounting port 34, as shown in FIGS. 12, 13, and 14. During mounting of the object 2 into the mounting space 33 through the left mounting port 34, when a leading end of the object 2 comes into contact with the left inclined contact surface 431, it pushes the locking member 4' to rotate about the axis of the rod portion 42 in the clockwise direction (III), as shown in FIG. 12. When the leading end of the object 2 moves past the left hook portion 43 to contact the right force-resisting portion 421, it pushes the locking member 4' to rotate about the axis of the rod portion 42 in the counterclockwise direction (IV), as shown in FIG. 13. Hence, the object 2 can be moved entirely into the mounting space 33, as shown in FIG. 14.

In view of the above, since the mounting direction (I, V) is perpendicular to the assembling direction (II), the object 2 can be locked effectively within the mounting space 33. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:

1. A locking mechanism adapted for fixedly locking an object to a base element, the object having two opposite sides, said locking mechanism comprising:
   a housing adapted to be provided on the base element, and including a base wall and a cover extending from said base wall to form a mounting space therebetween, and a mounting port in spatial communication with said mounting space and adapted for permitting the object to be moved into said mounting space therethrough in a mounting direction; and
   a locking member snapped onto said cover so as to prevent removal of the object from said mounting space through said mounting port in a direction opposite to the mounting direction to fixedly lock the object to the base element, in such a manner that a portion of said locking member is disposed in proximity to said mounting port and abuts against one of the sides of the object facing said mounting port.

2. The locking mechanism as claimed in claim 1, wherein said housing further includes a top wall spaced apart from said base wall and formed with at least one retaining groove, said locking member including a rod portion engaged within said retaining groove, a supporting arm connected to said rod portion, and at least one hook portion extending from an end of said supporting arm and adapted to abut against the object, said hook portion constituting said portion of said locking member disposed in proximity to said mounting port.

3. The locking mechanism as claimed in claim 2, wherein said top wall includes a wall portion, and at least one pair of limiting resilient arms extending from said wall portion, said retaining groove being defined among said limiting resilient arms and said wall portion and having a retaining groove portion engaging said rod portion, and a guiding groove portion that is open upwardly for guiding movement of said rod portion into said retaining groove portion and that has a width smaller than that of each of said retaining groove portion and said rod portion.

4. The locking mechanism as claimed in claim 3, wherein said housing cooperates with said base wall to form two said mounting ports so as to allow the object to be moved into said mounting space through either of said mounting ports, said locking member including two said hook portions, said hook portions being adapted to abut respectively against the sides of the object.

5. The locking mechanism as claimed in claim 3, wherein said top wall includes two spaced-apart pairs of said limiting resilient arms extending from said wall portion, said wall portion having a hole that is formed therethrough in a vertical direction and between said pairs of said limiting resilient arms and that is in spatial communication with said mounting space and said mounting port, so that two said retaining grooves are defined respectively by said pairs of said limiting resilient arms, said rod portion being cylindrical and being received rotatably within said retaining grooves, said supporting arm being disposed within said hole.

6. The locking mechanism as claimed in claim 5, wherein a distance between said base wall and said top wall is smaller than that between said base wall and said supporting arm.

7. The locking mechanism as claimed in claim 6, wherein said supporting arm is divided by said rod portion into a force-resisting portion distal from said mounting port, and a force-applying portion proximate to said mounting port, said force-resisting portion being adapted for contact with the object so as to be pushed by the object to rotate about an axis of said rod portion during movement of the object into said mounting space, said hook portion extending from said force-applying portion and including an inclined contact surface adapted for contact with the object so as to be pushed by the object to rotate about the axis of said rod portion during movement of the object into said mounting space.

8. The locking mechanism as claimed in claim 7, wherein said housing further includes two guide plates extending from said base wall and adapted for guiding movement of the object into said mounting space through said mounting port.

9. The locking mechanism as claimed in claim 6, wherein said housing cooperates with said base wall to form two said mounting ports so as to allow the object to be moved into said mounting space through either of said mounting ports, said hole being in spatial communication with said mounting ports, said supporting arm including two arm portions located respectively to two opposite sides of said rod portion and adjacent respectively to said mounting ports, said arm portions being adapted for contact with the object so as to be pushed by the object to rotate about the axis of said rod portion during movement of the object into said mounting space, said locking member including two said hook portions extending respectively from said arm portions, each of said hook portions including an inclined contact surface adapted for contact with the object so as to be pushed by the object to rotate about an axis of said rod portion during movement of the object into said mounting space.

10. The locking mechanism as claimed in claim 9, wherein said housing further includes two pairs of guide plates extending from said base wall, one pair of said guide plates being adapted for guiding movement of the object into said mounting space through one of said mounting ports, the other pair of said guide plates being adapted for guiding movement of the object into said mounting space through the other of said mounting ports.

11. An electronic device comprising:
a first body;
a second body connected pivotally to said first body and pivotable relative to said first body to cover said first body, said second body including
an object, and
a locking mechanism provided on a main portion of said second body for fixedly locking said object to said main portion of said second body, and including a housing and a locking member, said housing including a base wall and a cover extending from said base wall to form a mounting space therebetween, and a mounting port in spatial communication with said mounting space and permitting said object to be moved into said mounting space therethrough in a mounting direction, said locking member being snapped onto said cover so as to prevent removal of said object from said mounting space through said mounting port in a direction opposite to the mounting direction to fixedly lock said object to said main portion of said second body, in such a manner that a portion of said locking member is disposed in proximity to said mounting port and abuts against one of the sides of said object facing said mounting port.

12. The electronic device as claimed in claim 11, wherein said housing further includes a top wall spaced apart from said base wall and formed with at least one retaining groove, said locking member including a rod portion engaged within said retaining groove, a supporting arm connected to said rod portion, and at least one hook portion extending from an end of said supporting arm and abutting against said object, said hook portion constituting said portion of said locking member disposed in proximity to said mounting port.

13. The electronic device as claimed in claim 12, wherein said top wall includes a wall portion, and at least one pair of limiting resilient arms extending from said wall portion, said retaining groove being defined among said limiting resilient arms and said wall portion and having a retaining groove portion engaging said rod portion, and a guiding groove portion that is open upwardly for guiding movement of said rod portion into said retaining groove portion and that has a width smaller than that of each of said retaining groove portion and said rod portion.

14. The electronic device as claimed in claim 13, wherein said housing cooperates with said base wall to form two said mounting ports so as to allow said object to be moved into said mounting space through either of said mounting ports, said locking member including two said hook portions, said hook portions abutting respectively against the sides of said object.

15. The electronic device as claimed in claim 13, wherein said top wall includes a wall portion, and two spaced-apart pairs of limiting resilient arms extending from said wall portion, said wall portion having a hole that is formed therethrough in a vertical direction and between said pairs of said limiting resilient arms and that is in spatial communication with said mounting space and said mounting port, so that two said retaining grooves are defined respectively by said pairs of said limiting resilient arms, said rod portion being cylindrical and being received rotatably within said retaining grooves, said supporting arm being disposed within said hole.

16. The electronic device as claimed in claim 15, wherein a distance between said base wall and said top wall is smaller than that between said base wall and said supporting arm.

17. The electronic device as claimed in claim 16, wherein said supporting arm is divided by said rod portion into a force-resisting portion distal from said mounting port, and a force-applying portion proximate to said mounting port, said force-resisting portion being contactable with said object so as to be pushed by said object to rotate about the axis of said rod portion during movement of said object into said mounting space, said hook portion extending from said force-applying portion and including an inclined contact surface that is contactable with said object so as to be pushed by said object to rotate about the axis of said rod portion during movement of said object into said mounting space.

18. The electronic device as claimed in claim 17, wherein said housing further includes two guide plates extending from said base wall for guiding movement of said object into said mounting space through said mounting port.

19. The electronic device as claimed in claim 16, wherein said housing cooperates with said base wall to form two said mounting ports so as to allow said object to be moved into said mounting space through either of said mounting ports, said hole being in spatial communication with said mounting ports, said supporting arm including two arm portions located respectively to two opposite sides of said rod portion and adjacent respectively to said mounting ports, said arm portions being contactable with said object so as to be pushed by the object to rotate about the axis of said rod portion during movement of said object into said mounting space, said locking member including two said hook portions extending respectively from said arm portions, each of said hook portions including an inclined contact surface contactable with said object so as to be pushed by said object to rotate about the axis of said rod portion during movement of said object into said mounting space.

20. The electronic device as claimed in claim 19, wherein said housing further includes two pairs of guide plates extending from said base wall, one pair of said guide plates being disposed for guiding movement of said object into said mounting space through one of said mounting ports, the other pair of said guide plates being disposed for guiding movement of said object into said mounting space through the other of said mounting ports.

* * * * *